United States Patent
Yuan et al.

(10) Patent No.: US 11,800,146 B2
(45) Date of Patent: Oct. 24, 2023

(54) CENTROID POINT SEARCH-BASED FAST GLOBAL MOTION MATCHING METHOD AND SYSTEM FOR DYNAMIC POINT CLOUD

(71) Applicant: SHANDONG UNIVERSITY, Jinan (CN)

(72) Inventors: Hui Yuan, Jinan (CN); Tingting Wang, Jinan (CN); Tian Guo, Jinan (CN); Shuai Li, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 35 days.

(21) Appl. No.: 17/653,355

(22) Filed: Mar. 3, 2022

(65) Prior Publication Data
US 2023/0262257 A1    Aug. 17, 2023

(30) Foreign Application Priority Data
Feb. 17, 2022    (CN) .......................... 202210144056.9

(51) Int. Cl.
*G06T 17/00*    (2006.01)
*H04N 19/54*    (2014.01)
*G06F 17/16*    (2006.01)

(52) U.S. Cl.
CPC ............. *H04N 19/54* (2014.11); *G06F 17/16* (2013.01); *G06T 17/00* (2013.01)

(58) Field of Classification Search
CPC .......... H04N 19/54; G06F 17/16; G06T 17/00
See application file for complete search history.

(56) References Cited

U.S. PATENT DOCUMENTS

| | | | |
|---|---|---|---|
| 7,755,703 B2* | 7/2010 | Ogawa | H04N 5/211 348/614 |
| 2007/0229487 A1* | 10/2007 | Slavenburg | H04N 13/398 345/213 |

(Continued)

OTHER PUBLICATIONS

Yuan et al. "Global Rate-distortion Optimization of Video-based Point Cloud Compression with Differential Evolution", 2021 IEEE 23rd International Workshop on Multimedia Signal Processing (MMSP) | 978-1-6654-3288-7/21/$31.00 © 2021 IEEE | DOI: 10.1109/MMSP53017.2021.9733714; 978-1-6654-3288-7/21/$31.00 © 2021 IEEE.*

(Continued)

*Primary Examiner* — Frank F Huang
(74) *Attorney, Agent, or Firm* — CBM PATENT CONSULTING, LLC (57) ABSTRACT

A motion estimation method and a system in inter-frame prediction coding of 3D point cloud data: first, isometric sub-sampling is performed for points in pc_likely_world, then, the sampled points were divided into uniform small cubes, and the centroid of point cloud location information in each small cube was calculated, and the points closest to the centroid were found, and these points were put into pc_world_target. Finally, the corresponding point pc_world_ref is found in the reference frame, and the LMS algorithm is used to calculate the global motion matrix; by reserving the centroid points in each block, the method not only effectively removes the redundant points to reduce the computational complexity of the global motion matrix but also preserves the points that represent the characteristics of the point cloud to ensure the computational accuracy of the global motion matrix.

10 Claims, 2 Drawing Sheets

(56) References Cited

U.S. PATENT DOCUMENTS

| | | | |
|---|---|---|---|
| 2008/0079805 A1* | 4/2008 | Takagi | H04N 13/122 |
| | | | 348/E13.067 |
| 2013/0002936 A1* | 1/2013 | Hirama | H04N 23/672 |
| | | | 348/349 |
| 2014/0168387 A1* | 6/2014 | Aoki | H04N 25/704 |
| | | | 348/49 |
| 2014/0232869 A1* | 8/2014 | May | H04N 23/811 |
| | | | 348/148 |
| 2015/0009296 A1* | 1/2015 | Crona | H04N 13/239 |
| | | | 348/47 |

OTHER PUBLICATIONS

Yuan et al. Mid-level features and spatio-temporal context for activity recognition Pattern Recognition 45 (2012)4182-4191 2012.*

* cited by examiner

CENTROID POINT SEARCH-BASED FAST GLOBAL MOTION MATCHING METHOD AND SYSTEM FOR DYNAMIC POINT CLOUD

CROSS REFERENCES

The invention relates to a motion estimation method and a system in inter-frame prediction coding of 3D point cloud data, belonging to the technical field of image processing.

TECHNICAL FIELD

The invention relates to a motion estimation method and a system in inter-frame prediction coding of 3D point cloud data, belonging to the technical field of image processing.

TECHNICAL BACKGROUND

The use of 3D point cloud data has been popularized in various fields such as virtual/augmented reality, robotics, geographic information systems, medical fields, etc. With the development of 3D point cloud data and the continuous improvement of the benchmark and speed of 3D point cloud data scanning equipment (such as lidar and Kinect motion-sensing camera), a large number of point cloud data on the surface of objects, often including hundreds of thousands of points in a scene, can be accurately obtained. Such a large amount of point cloud data also brings challenges to the storage and transmission of computers. Therefore, the compression of 3D point cloud data has become a hot issue.

According to different application scenarios, the point clouds can be divided into static point clouds, dynamic point clouds, and dynamically acquired point clouds. MPEG (Moving Pictures Experts Group) has developed two-point cloud compression technical standards: video-based 3D point cloud compression (V-PCC) for dynamic point clouds and geometry-based 3D point cloud compression (G-PCC) for static point clouds and dynamically acquired point clouds. Among them, V-PCC encodes by projecting 3D information onto a 2D plane, while G-PCC encodes directly in 3D space. Inter-EM (Inter-Exploration Model) under the G-PCC coding framework is a technical standard for dynamically acquired point clouds coding. Due to the large temporal redundancy between dynamically acquired point clouds, motion estimation becomes an indispensable key technique in Inter-EM.

In TMC13v12 Inter-EM v2.0, the motion estimation process is divided into the following six steps: Step 1, the current frame point cloud is firstly divided into road points and object points by two thresholds top_z_boundary and bottom_z_boundary on the z-axis. If the z value of point cloud is larger than top_z_boundary or smaller than bottom_z_boundary, it is divided into object points. Otherwise, it is divided into road points. Step 2, the current point cloud is divided into blocks of an uniform size to find the points belonging to the object, and if the points belonging to the object have corresponding points at the same position of the reference frame, these points are placed into pc_likely_world. Step 3, isometric sampling of pc_likely_world to obtain 2000 points, and putting these points into pc_world_target. Step 4, finding the corresponding point pc_world_ref of pc_world_target in the reference frame. Step 5, the global motion matrix (Mat_GM) is calculated by Least Mean Square (LMS) algorithm for pc_world_target and pc_world_ref. Step 6, Mat_GM is applied to the object points of the reference frame point cloud. At this point, the motion estimation process is finished. When the LMS algorithm is used to calculate the global motion matrix, 2000 points in pc_world_target and 2000 points in pc_world_ref must be operated every time, which will cause two main problems: First, a large number of points will significantly increase the computational complexity of Mat_GM. Second, pc_world_target contains a large number of redundant points, which will affect the calculation accuracy of Mat_GM.

Invention Content

Aiming at the disadvantage of the high computational complexity of the global motion matrix in the process of motion estimation, the invention proposed a fast global motion matching method of dynamic point cloud based on centroid point search.

The invention also provided a fast global motion matching system of dynamic point cloud based on centroid point search.

Term Interpretation
1. Point cloud: refers to a set of vectors in a 3D coordinate system. Point cloud data generally contains position information (x, y, z) and attribute information such as color, reflectance, and normal vector.
2. Inter-EMv2.0 software: Point cloud can be divided into static point cloud, dynamic point cloud, and dynamically acquired point cloud according to different application scenarios. MPEG (Moving Pictures Experts Group) has developed two-point cloud compression technical standards: video-based 3D point cloud compression (V-PCC) for dynamic point clouds and geometry-based 3D point cloud compression (G-PCC) for static point clouds and dynamically acquired point clouds. Inter-EMv2.0 software is a tool for inter-frame prediction in the G-PCC framework. Inter-EMv2.0 software can use the information of previously encoded frames to predict the current frame information.
3. Kd-tree search: Kd-tree (K-dimensional tree) is a binary tree, which stores some K-dimensional data. Building a Kd-tree on a K-dimensional data set represents a division of the K-dimensional space constituted by the data set, that is, each node in the tree corresponds to a K-dimensional hyperrectangular region. Kd-tree search is a search algorithm based on Kd-tree. Before introducing Kd-tree search, the construction algorithm of Kd-tree is briefly introduced as follows:
   (1) Select the dimension K with the largest variance in the K-dimension data set, and then select the median value m on the dimension as the benchmark to divide the data set, then get two subsets, meanwhile, create a tree node to store data.
   (2) Repeat the process of step (1) for two subsets until all subsets can no longer be divided. If a subset can no longer be divided, the data in that subset is saved to the leaf node.

After the construction of Kd-tree, the Kd-tree search algorithm is introduced as follows:
   (1) Query data Q starts from the root node and accesses Kd-tree down according to the comparison results between Q and each node until the leaf node is reached. Where the comparison between Q and node refers to the comparison between the value of K dimension corresponding to Q and m in the node. Q(k)<m, access the left subtree, otherwise access the right subtree. When the leaf node is reached, the distance between Q and the data stored on the leaf node is calculated, and the data points corresponding to the minimum distance are recorded as the current "nearest neighbor point" Pcur and the minimum distance Dcur.

(2) Perform a backtracking operation, which is to find the nearest neighbor point closer to Q. That is, to determine whether there are any points in the unvisited branches that are closer to Q than Dcur. If the distance between Q and the unvisited branch under its parent node is less than Dcur, it is considered that there is data closer to Q in this branch. Enter this node and perform the same search process as in step (1). If a data point closer is found, it is updated to the current "nearest neighbor point" Pcur, and Dcur is updated. If the distance between Q and the unvisited branch under its parent is greater than Dcur, then there is no point closer to Q within that branch. The judgment process of backtracking goes from bottom to top until there is no branch closer to Q when it reaches the root node. At this point, the Kd-tree search algorithm ends.

The technical scheme of the invention is as follows:

A fast global motion matching method for dynamic point cloud based on centroid point search, including the following steps:

Step 1: The current frame point cloud is divided into road points and object points by two thresholds top_z_boundary and bottom_z_boundary on the z-axis. If the z value of point cloud is greater than top_z_boundary or less than bottom_z_boundary, it is divided into object points. Otherwise, it is divided into road points;

Step 2: Search the associated points corresponding to all object points in the reference frame corresponding to the current frame. The reference frame refers to the reconstructed point cloud frame output by the point cloud of the previous frame after a complete codec process. The associated point refers to the corresponding point of the point in the current frame in the reference frame. Place object points with corresponding associated points into pc_likely_world;

Step 3: Isometric sampling pc_likely_world, and put the sampled points into pc_world_target, specifically refers to:

Define a self-defined array pc_world_target_temp, put the points sampled under the isometric distance of pc_likely_world into pc_world_target_temp, divide pc_world_target_temp into evenly sized blocks, only retain the centroid points in each block, and put these centroid points into pc_world_target;

Step 4: Find the corresponding points pc_world_ref of pc_world_target in the reference frame;

Step 5: Apply LMS algorithm to pc_world_target and pc_world_ref to calculate the global motion matrix;

Step 6: Apply Mat_GM to the object points of the reference frame point cloud. At this point, the motion estimation process is finished.

According to the invention, the specific realization process of step 2 preferably includes:

Step 2.1: Through Inter-EM v2.0 software, a cube enveloping box is established for the point cloud data of the current frame. The cube enveloping box enclothes point cloud data of all the current frames. Divide the cube bounding box into cubes of motion_block_size×motion_block_size×motion_block_size. Where motion_block_size and th_dist are parameters of Inter-EM v2.0, th_dist is equal to 31;

Step 2.2: Ordinal traverse each small cube in the current frame, if the small cube M which is in the current frame has at least one point, to find the small cube $M_{ref}$ in the reference frame of the corresponding small cube M. If there is at least one point in the $M_{ref}$, M is considered to have corresponding points in the reference frame, otherwise, there are no corresponding points of M in the reference frame.

According to the optimization of the invention, pc_world_target_temp is divided into small cubes in step 3, which refers to:

Find the smallest and largest components of position information (x, y, z) in pc_world_target_temp respectively, form the minimum point: bbox.min=($\min(x_i)_{i=0 \ldots N-1}$, $\min(y_i)_{i=0 \ldots N-1}$, $\min(z_i)_{i=0 \ldots N-1}$) and the biggest point: bbox.max=($\max(x_i)_{i=0 \ldots N-1}$, $\max(y_i)_{i=0 \ldots N-1}$, $\max(z_i)_{i=0 \ldots N-1}$), among them $x_i$, $y_i$, $z_i$ represents the position information of the i-th point respectively, N is the number of points;

Create a cube bounding box based on the minimum and maximum points to enclose the point cloud data in the entire array pc_world_target_temp. Divide the cube bounding box into small cubes of motion_block_size×motion_block_size×motion_block_size starting from the minimum point coordinates.

According to the optimization of the invention, in step 3, find the centroid point in each small cube and put it into pc_world_target, which refers to:

① If the number of point clouds in the small cube is less than 3, directly discard these points;

② If the number of point clouds in the cube is greater than or equal to 3, find the centroid point $P_{centroid}$ in the cube; find the nearest point $P_c$ by Kd-tree search, and put $P_c$ into pc_world_target;

Further optimized, the calculation formula of centroid $P_{centroid}$ is shown in equation (1):

$$P_{centroid} = \frac{1}{N}\sum_{i=1}^{N} X_i, \tag{1}$$

in formula (1), $X_i$ is the location information of the midpoints of the small cube, and N is the number of the small cube.

According to the invention, the specific realization process of step 5 preferably includes:

$$P_{ref} = \begin{bmatrix} x_1 & y_1 & z_1 & MV\_unity \\ x_2 & y_2 & z_2 & MV\_unity \\ \vdots & \vdots & \vdots & \vdots \\ x_N & y_N & z_N & MV\_unity \end{bmatrix}, P_{target} = \begin{bmatrix} x'_1 & y'_1 & z'_1 \\ x'_2 & y'_2 & z'_2 \\ \vdots & \vdots & \vdots \\ x'_N & y'_N & z'_N \end{bmatrix},$$

among them, $x_i$, $y_i$, $z_i$ represents the position information of the i-th point in pc_world_ref respectively, $x'_i$, $y'_i$, $z'_i$ represents the position information of the i-th point in pc_world_target respectively, N is the number of points, $P_{target} \in \mathbb{R}^{N\times 3}$, $P_{ref} \in \mathbb{R}^{N\times 4}$, MV_unity is an adaptive parameter.

Define correlation matrix M, $M \in \mathbb{R}^{4\times 4}$, $M = P_{ref}^T P_{ref}$;

The inverse matrix of M is obtained by gaussian elimination method, then transform it into Hermite matrix, $M^{-1}$ is obtained;

Define transformation matrix R, $R \in \mathbb{R}^{4\times 3}$, $R = P_{ref}^T P_{target}$;

Define transformation matrix T, $T_1$, $T \in \mathbb{R}^{4\times 3}$, $T_1 \in \mathbb{R}^{4\times 3}$, $$T_1 = M^{-1}R,$$

$$T = \begin{bmatrix} T_1[0] \\ T_1[1] \\ T_1[2] \\ MV\_unity \times T_1[3] \end{bmatrix},$$

At this point, the third row of the matrix $T_1$ data $T_1[3]$ is multiplied by the parameter MV_unity to obtain T[3], that is, $T[3]=MV\_unity \times T_1[3]$;

In the first iteration, the initial value of Mat_GM is:

$$Mat\_GM = \begin{bmatrix} 1 & 0 & 0 \\ 0 & 1 & 0 \\ 0 & 0 & 1 \\ 0 & 0 & 0 \end{bmatrix};$$

Define intermediate variable Mat_GML, Mat_GML=Mat_GM;

Inter-EMv2.0 defines the number of iterations NLMS=10, which means that in the next iteration, Mat_GM obtained in the last iteration is assigned to the intermediate variable Mat_GML as the initial value;

Mat_GML and T are mathematically calculated to obtain Mat_GM, and the specific process is as follows:

For the transformation part:
Set the initial value: l=0, c=0;

$Mat\_GM[l][c]=Mat\_GML[l][0] \times T[0][c]+Mat\_GML[l][1] \times T[1][c]+Mat\_GML[l][2] \times T[2][c]$ l increases by 1, c increases by 1, and Mat_GM [l][c] is iterated until the iteration termination condition is reached, i.e. l<3 & c<3;

For the transformation part:
Set the initial value: c=0;

$Mat\_GM[3][c]=Mat\_GML[3][0] \times T[0][c]+Mat\_GML[3][1] \times T[1][c]+Mat\_GML[3][2] \times T[2][c]+T[3][c]$ l increases by 1, c increases by 1, and Mat_GM [3][c] is iterated until the iteration termination condition is reached, i.e. c<3.

In step 6, preferably according to the invention, $P_i[0]=Mat\_GM[0][0] \times B_i[0]+Mat\_GM[1][0] \times B_i[1]+Mat\_GM[2][0] \times B_i[2]Mat\_GM[3][0]$ $P_i[1]=Mat\_GM[0][1] \times B_i[0]+Mat\_GM[1][1] \times B_i[1]+Mat\_GM[2][1] \times B_i[2]Mat\_GM[3][1]$ $P_i[2]=Mat\_GM[0][2] \times B_i[0]+Mat\_GM[1][2] \times B_i[1]+Mat\_GM[2][2] \times B_i[2]Mat\_GM[3][2]$ Where, $B_i$ is the location information of reference frame point cloud belonging to object, $0 \leq N \leq 1$, N is the number of reference frame point cloud belonging to object. $B_i[0]$ is the x-axis information of point $B_i$, $B_i[1]$ is the y-axis information of the point $B_i$, and $B_i[2]$ is the z-axis information of point $B_i$, Mat_GM is a matrix of four rows and three columns. $P_i$ is the position information of the point obtained by applying Mat_GM. $P_i[0]$ is the information of the x-axis of point $P_i$, $P_i[1]$ is the information of the y-axis of point $P_i$, and $P_i[2]$ is the information of the z-axis of point $P_i$.

A fast global motion matching system of dynamic point cloud based on centroid point search is proposed, which includes road points and object points division unit, associated points search unit, centroid point extraction unit, global motion matrix calculation unit, and global motion matrix application unit.

The road points and object points division units are used to perform step 1; The association points search unit is used to perform step 2; The centroid point extraction unit is used to perform step 3; The global motion matrix computing unit is used to perform step 4 and step 5; The global motion matrix application unit is used to perform step 6.

A computer device includes a memory and a processor, wherein the memory stores a computer program, and the processor executes the computer program steps for implementing a fast global motion matching method for a dynamic point cloud based on a centroid point search.

A computer-readable storage medium on which a computer program is stored, and the steps of realizing a fast global motion matching method of dynamic point cloud based on centroid point search when the computer program is executed by the processor.

The beneficial effects of the invention are as follows:

Compared with the original method, the coding time of the invention is reduced by at least 58% under the condition that the rate-distortion performance is slightly reduced, and the coding time complexity of the point cloud sequence is reduced.

SPECIFIC IMPLEMENTATION MODE

Figure 1:
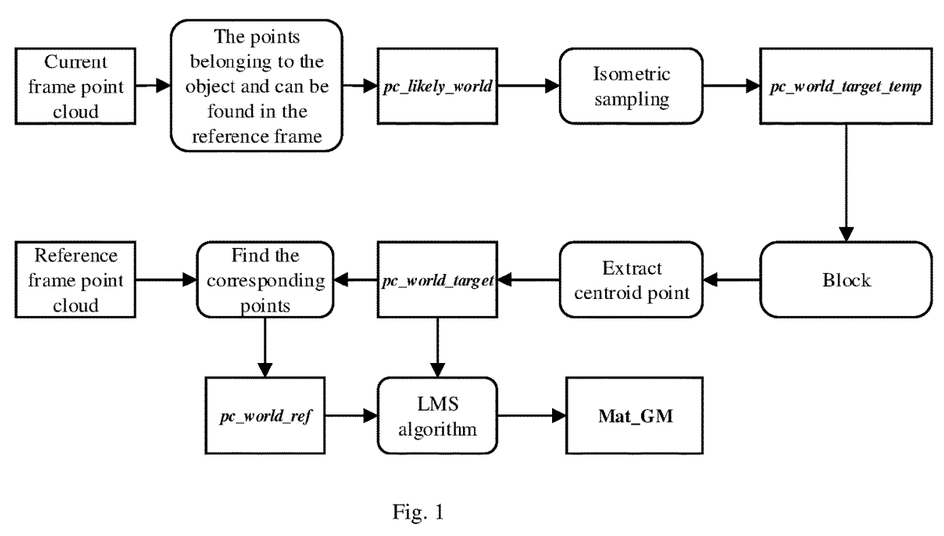
FIG. 1 is the flow diagram of the fast global motion matching method of dynamic point cloud based on the centroid point search of the invention.
Figure 2:
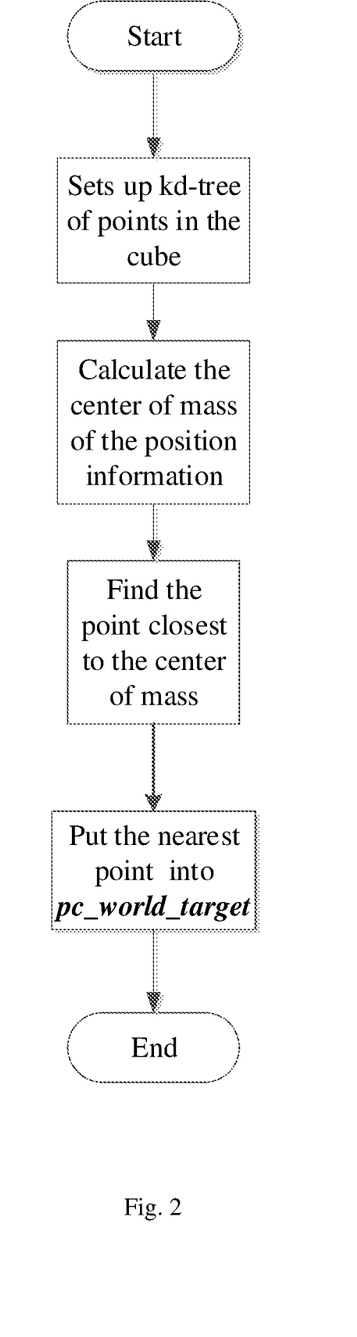
FIG. 2 is a schematic diagram of the extraction process of centroid points.

The invention is further defined, but not limited to, in combination with the appended drawings and embodiments of the specification.

Implementation Example 1

A fast global motion matching method for dynamic point cloud based on centroid point search, including the following steps:

Step 1: The current frame point cloud is divided into road points and object points by two thresholds top_z_boundary and bottom_z_boundary on z-axis. top_z_boundary and bottom_z_boundary are the two thresholds of the z-axis calculated according to point cloud data of each frame, which are equivalent to the two parameters of a point cloud of each frame and are two definite values. If the z value of point cloud is greater than top_z_boundary or less than bottom_z_boundary, it is divided into object points. Otherwise, it is divided into road points;

Step 2: Search the associated points corresponding to all object points in the reference frame corresponding to the current frame. The reference frame refers to the reconstructed point cloud frame output by the point cloud of the previous frame after a complete codec process. The associated point refers to the corresponding point of the point in the current frame in the reference frame. Place object points with corresponding associated points into pc_likely_world; pc_likely_world is the name of a vector variable defined in Inter-EM v2.0 software. Vector is a dynamic array that can store any type in c++ syntax. That is to say, pc_likely_world is the name of an array used to store point cloud data meeting the above requirements. The specific implementation process includes:

Step 2.1: Through Inter-EM v2.0 software, a cube enveloping box is established for the point cloud data of the current frame. The cube enveloping box enclothes point cloud data of all the current frames. Divide the cube bounding box into cubes of motion_block_size×motion_block_size×motion_block_size. Where motion_block_size and th_dist are parameters of Inter-EM v2.0, th_dist is equal to 31;

Step 2.2: Ordinal traverse each small cube in the current frame, if the small cube M which is in the current frame has at least one point, to find the small cube $M_{ref}$ in the reference frame of the corresponding small cube M. If there is at least one point in the $M_{ref}$, M is considered to have corresponding points in the reference frame, otherwise, there are no corresponding points of M in the reference frame.

Step 3: Isometric sampling pc_likely_world, and put the sampled points into pc_world_target, specifically refers to:

Define a self-defined array pc_world_target_temp, put the points sampled under the isometric distance of pc_likely_world into pc_world target temp, divide pc_world_target_temp into evenly sized blocks, only retain the centroid points in each block, and put these centroid points into pc_world_target;

In step 3, pc_world_target_temp is divided into small cubes, which refers to:

Find the smallest and largest components of position information (x, y, z) in pc_world_target_temp respectively, form the minimum point: bbox.min=$(\min(x_i)_{i=0 \ldots N-1}, \min(y_i)_{i=0 \ldots N-1}, \min(z_1)_{i=0 \ldots N-1})$ and the biggest point: bbox.max=$(\max(x_i)_{i=0 \ldots N-1}, \max(y_i)_{i=0 \ldots N-1}, \max(z_1)_{i=0 \ldots N-1})$, among them $x_i$, $y_i$, $z_i$ represents the position information of the i-th point respectively, N is the number of points;

Create a cube bounding box based on the minimum and maximum points to enclose the point cloud data in the entire array pc_world_target_temp. Divide the cube bounding box into small cubes of motion_block_size×motion_block_size×motion_block_size starting from the minimum point coordinates.

According to the optimization of the invention, in step 3, find the centroid point in each small cube and put it into pc_world_target, which refers to:

① If the number of point clouds in the small cube is less than 3, directly discard these points;

② If the number of point clouds in the cube is greater than or equal to 3, find the centroid point $P_{centroid}$ in the cube; find the nearest point $P_c$ by Kd-tree search, and put $P_c$ into pc_world_target;

Further optimized, the calculation formula of centroid $P_{centroid}$ is shown in equation (1):

$$P_{centroid} = \frac{1}{N}\sum_{i=1}^{N} X_i, \quad (1)$$

in formula (1), $X_i$ is the location information of the midpoints of the small cube, and N is the number of the small cube.

Step 4: Find the corresponding points pc_world_ref of pc_world_target in the reference frame;

Step 5: Apply LMS algorithm to pc_world_target and pc_world_ref to calculate the global motion matrix, specifically refers to:

The specific realization process of step 5 preferably includes:

$$P_{ref} = \begin{bmatrix} x_1 & y_1 & z_1 & MV\_unity \\ x_2 & y_2 & z_2 & MV\_unity \\ \vdots & \vdots & \vdots & \vdots \\ x_N & y_N & z_N & MV\_unity \end{bmatrix}, P_{target} = \begin{bmatrix} x'_1 & y'_1 & z'_1 \\ x'_2 & y'_2 & z'_2 \\ \vdots & \vdots & \vdots \\ x'_N & y'_N & z'_N \end{bmatrix},$$

among them, $x_i$, $y_i$, $z_i$ represents the position information of the i-th point in pc_world_ref respectively, $x_i$, $y_i$, $z_i$ represents the position information of the i-th point in pc_world_target respectively, N is the number of points, $P_{target} \in \mathbb{R}^{N\times 3}$, $P_{ref} \in \mathbb{R}^{N\times 4}$, MV_unity is an adaptive parameter.

Define correlation matrix M, $M \in \mathbb{R}^{4\times 4}$, $M = P_{ref}^T P_{ref}$;

The inverse matrix of M is obtained by gaussian elimination method, then transform it into Hermite matrix, $M^{-1}$ is obtained;

Define transformation matrix R, $R \in \mathbb{R}^{4\times 3}$, $R = P_{ref}^T P_{target}$;

Define transformation matrix T, $T_1$, $T \in \mathbb{R}^{4\times 3}$, $T_1 \in \mathbb{R}^{4\times 3}$, $$T_1 = M^{-1}R,$$

$$T = \begin{bmatrix} T_1[0] \\ T_1[1] \\ T_1[2] \\ MV\_unity \times T_1[3] \end{bmatrix},$$

At this point, the third row of the matrix $T_1$ data $T_1[3]$ is multiplied by the parameter MV_unity to obtain T[3], that is, T[3]=MV_unity×$T_1$[3];

In the first iteration, the initial value of Mat_GM is:

$$Mat\_GM = \begin{bmatrix} 1 & 0 & 0 \\ 0 & 1 & 0 \\ 0 & 0 & 1 \\ 0 & 0 & 0 \end{bmatrix};$$

Define intermediate variable Mat_GML, Mat_GML=Mat_GM;

Inter-EMv2.0 defines the number of iterations NLMS=10, which means that in the next iteration, Mat_GM obtained in the last iteration is assigned to the intermediate variable Mat_GML as the initial value;

Mat_GML and T are mathematically calculated to obtain Mat_GM, and the specific process is as follows:

For the transformation part:
Set the initial value: l=0, c=0;

Mat_*GM*[*l*][*c*]=Mat_*GML*[*l*][0]×*T*[0][*c*]+Mat_*GML*[*l*][1]×*T*[1][*c*]+mat_*GML*[*l*][2]×*T*[2][*c*]

l increases by 1, c increases by 1, and Mat_GM [l][c] is iterated until the iteration termination condition is reached, i.e. l<3 & c<3;

For the transformation part:
Set the initial value: c=0;

Mat_*GM*[3][*c*]=Mat_*GML*[3][0]×*T*[0][*c*]+Mat_*GML*[3][1]×*T*[1][*c*]+Mat_*GML*[3][2]×*T*[2][*c*]+*T*[3][*c*]

l increases by 1, c increases by 1, and Mat_GM [3][c] is iterated until the iteration termination condition is reached, i.e. c<3.

Step 6: Apply Mat_GM to the object points of the reference frame point cloud. At this point, the motion estimation process is finished.

In step 6, preferably according to the invention, $P_i[0]$=Mat_*GM*[0][0]×$B_i$[0]+Mat_*GM*[1][0]×$B_i$[1]+Mat_*GM*[2][0]×$B_i$[2]Mat_*GM*[3][0]

$P_i[1]$=Mat_*GM*[0][1]×$B_i$[0]+Mat_*GM*[1][1]×$B_i$[1]+Mat_*GM*[2][1]×$B_i$[2]Mat_*GM*[3][1]

$P_i[2]$=Mat_*GM*[0][2]×$B_i$[0]+Mat_*GM*[1][2]×$B_i$[1]+Mat_*GM*[2][2]×$B_i$[2]Mat_*GM*[3][2]

Where, $B_i$ is the location information of reference frame point cloud belonging to object, $0 \leq N \leq 1$, N is the number of reference frame point cloud belonging to object. $B_i[0]$ is the x-axis information of point $B_i$, $B_i[1]$ is the y-axis information of the point $B_i$, and $B_i[2]$ is the z-axis information of point $B_i$, Mat_GM is a matrix of four rows and three columns. $P_i$ is the position information of the point obtained by applying Mat_GM. $P_i[0]$ is the information of the x-axis of point $P_i$, $P_i[1]$ is the information of the y-axis of point $P_i$, and $P_i[2]$ is the information of the z-axis of point $P_i$.

The effect of the invention can be further explained by experiments. Table 1 is a comparison diagram of encoding time complexity and rate-distortion performance between the invention and the original Inter-EMv2.0 method.

In the TMC13v12 Inter-EMv2.0 coding framework, the coding complexity and rate-distortion performance of Cat3 sequences are tested under the lossy geometry-lossy attribute condition. Table 1 compares the encoding time complexity and rate-distortion performance of the invention with that of the original method in Inter-EMv2.0.

TABLE 1

| Class | Sequence | Geom. BD-TotGeomRate [%] D1 | D2 | End-to-End BD-AttrRate [%] Reflectance | Geom. BD-TotalRate [%] D1 | D2 | End-to-End BD-TotalRate [%] Reflectance |
|---|---|---|---|---|---|---|---|
| cat3-frame | ford_01_q1mm | 0.6% | 0.6% | 0.0% | 0.6% | 0.6% | 0.5% |
| | ford_02_q1mm | 0.6% | 0.6% | 0.0% | 0.6% | 0.6% | 0.5% |
| | ford_03_q1mm | 0.4% | 0.4% | 0.0% | 0.4% | 0.4% | 0.3% |
| | qnxadas-junction-approach | 0.2% | \ | 0.1% | 0.2% | \ | 0.2% |
| | qnxadas-junction-exit | 0.3% | \ | 0.1% | 0.3% | \ | 0.3% |
| | qnxadas-motorway-join | 0.1% | \ | 0.0% | 0.1% | \ | 0.1% |
| | qnxadas-navigating-bends | 0.3% | \ | 0.0% | 0.2% | \ | 0.2% |
| | Cat3-frame average | 0.4% | 0.5% | 0.0% | 0.3% | 0.5% | 0.3% |
| Overall | Avg. Enc Time [%] | | | 42% | | | |
| | Avg. Dec Time [%] | | | 97% | | | |

It can be seen from Table 1 that, compared with the original method, the encoding time of the present invention is reduced by 58% under the condition that the rate-distortion performance is slightly reduced, indicating that the present invention reduces the encoding time complexity of point cloud sequence.

Implementation Example 2

A fast global motion matching system of dynamic point cloud based on centroid point search is proposed, which includes road points and object points division unit, associated points search unit, centroid point extraction unit, global motion matrix calculation unit, and global motion matrix application unit.

The road points and object points division units are used to perform step 1; The association points search unit is used to perform step 2; The centroid point extraction unit is used to perform step 3; The global motion matrix computing unit is used to perform step 4 and step 5; The global motion matrix application unit is used to perform step 6.

Implementation Example 3

A computer device includes a memory and a processor, wherein the memory stores a computer program, and the processor executes the computer program steps for implementing a fast global motion matching method for a dynamic point cloud based on a centroid point search.

Implementation Example 4

A computer-readable storage medium on which a computer program is stored, and the steps of realizing a fast global motion matching method of dynamic point cloud based on centroid point search when the computer program is executed by the processor.

What is claimed is:

1. A fast global motion matching method for dynamic point cloud based on centroid point search comprising the following steps:
   step 1: current frame point cloud is divided into road points and object points by two thresholds top_z_boundary and bottom_z_boundary on z axis; if z value of point cloud is greater than the top_z_boundary or less than the bottom_z_boundary, it is divided into object points; otherwise, it is divided into road points;
   step 2: search associated points corresponding to all object points in a reference frame corresponding to a current frame; the reference frame refers to a reconstructed point cloud frame output by the point cloud of a previous frame after a complete codec process; an associated point refers to a corresponding point of the point in the current frame in the reference frame; place the object points with corresponding the associated points into pc_likely_world;
   step 3: isometric sampling the pc_likely_world, and put sampled points into pc_world_target; specifically refers to:
   define a self-defined array pc_world_target temp, put the sampled points under an isometric distance of the pc_likely_world into the pc_world_target_temp, divide the pc_world_target_temp into evenly sized blocks, only retain centroid points in each block, and put the centroid points into the pc_world_target;
   step 4: find the corresponding points pc_world_ref of the pc_world_target in the reference frame;
   step 5: apply LMS algorithm to the pc_world_target and the pc_world_ref to calculate global motion matrix; and
   step 6: apply Mat_GM to the object points of the reference frame point cloud; at this point, a motion estimation process is completed.

2. The fast global motion matching method according to claim 1, wherein a specific realization process of step 2 includes:
   i) through Inter-EM v2.0 software, a cube enveloping box is established for point cloud data of the current frame; the cube enveloping box enclothes the point cloud data of all the current frames; divide the cube enveloping box into cubes of motion_block_size×motion_block_size×motion_block_size; where the motion_block_size and th_dist are parameters of Inter-EM v2.0, the th_dist is equal to 31;

ii) ordinal traverse each small cube in the current frame, if the small cube M which is in the current frame has at least one point, to find the small cube $M_{ref}$ in the reference frame of the corresponding small cube ; if there is at least one point in the $M_{ref}$, M is considered to have corresponding points in the reference frame, otherwise, there are no corresponding points of M in the reference frame.

3. The fast global motion matching method according to claim 1, wherein the pc_world_target_temp is divided into small cubes in step 3, which specifically refers to:
   find smallest and largest components of position information (x, y, z) in the pc_world_target_temp respectively, form minimum point: bbox.min= $(\min(x_i)_{i=0\ldots N-1}, \min(y_i)_{i=0\ldots N-1}, \max(z_i)_{i=0\ldots N-1})$, and maximum point: bbox.max=$(\max(x_i)_{i=0\ldots N-1}, \max(y_i)_{i=0\ldots N-1}\max(z_i)_{i=0\ldots N-1})$, among them $x_i$, $y_i$, $z_i$ represents the position information of the i-th point respectively, N is the number of points;
   create a cube bounding box based on the minimum and maximum points to enclose point cloud data in the entire array the pc_world_target_temp; divide the cube bounding box into small cubes of motion_block_size×motion_block_size×motion_block_size starting from minimum point coordinates.

4. The fast global motion matching method according to claim 1, wherein find the centroid point in each small cube and put it into the pc_world_target, in step 3, which refers to:
   i) if the number of point clouds in the small cube is less than 3, directly discard these points;
   ii) if the number of point clouds in the cube is greater than or equal to 3, find the centroid point $P_{centroid}$ in the cube; find the nearest point $P_c$ by Kd-tree search, and put $P_c$ into the pc_world_target.

5. The fast global motion matching method according to claim 1, wherein a calculation formula of centroid $P_{centroid}$ is shown in equation (1):

$$P_{centroid} = \frac{1}{N}\sum_{i=1}^{N} X_i, \quad (1)$$

in formula (1), $X_i$ is location information of midpoints of the small cube, and N is the number of midpoints of the small cube.

6. The fast global motion matching method according to claim 1, wherein a specific realization process of step 5 includes:

$$P_{ref} = \begin{bmatrix} x_1 & y_1 & z_1 & MV\_unity \\ x_2 & y_2 & z_2 & MV\_unity \end{bmatrix}, P_{target} = \begin{bmatrix} x'_1 & y'_1 & z'_1 \\ x'_2 & y'_2 & z'_2 \\ x'_N & y'_N & z'_N \end{bmatrix},$$

among them, $x_i$, $y_i$, $z_i$ represents the position information of the i-th point in the pc_world_ref respectively, $x_i$, $y_i$, $z_i$ represents the position information of the i-th point in the pc_world_target respectively, N is the number of points, $P_{target} \in z,?^{N \times 3}$, $P_{ref} \in z,?^{N \times 4}$, MV_unity is an adaptive parameter;
define correlation matrix M, $M \in z,?^{4 \times 4} M = P_{ref}^T P^{ref}$;
the inverse matrix of M is obtained by gaussian elimination method, then transform it into Hermite matrix, $M^{-1}$ is obtained;
define transformation matrix R, $R \in z,?^{4 \times 3}$, $R = P_{ref}^T P_{target}$;
define transformation matrix T, $T_1$, $T \in z,?^{4 \times 3} T_1 \in z,?^{4 \times 3}$, $T_1 = M^{-1}R$, $T_1 = M^{-1}R$, $$T = \begin{bmatrix} T_1[0] \\ T_1[1] \\ T_1[2] \\ MV\_unity \times T_1[3] \end{bmatrix},$$

at this point, the third row of the matrix $T_1$ data $T_1[3]$ is multiplied by the parameter MV_unity to obtain T [3], that is, T [3]=MV_unity×$T_1$[3];
in the first iteration, an initial value of the Mat_GM is:

$$Mat\_GM = \begin{bmatrix} 1 & 0 & 0 \\ 0 & 1 & 0 \\ 0 & 0 & 1 \\ 0 & 0 & 0 \end{bmatrix};$$

define intermediate variable Mat_GML, Mat_GML=Mat_GM;
inter-EMv2.0 defines the number of iterations NLMS=10, which means that in the next iteration, the Mat_GM obtained in the last iteration is assigned to the intermediate variable Mat_GML as the initial value;
Mat_GML and T are mathematically calculated to obtain the Mat_GM, and the specific process is as follows:
for the transformation part:
set the initial value: l=0, c=0;

Mat_GM[l][c]=Mat_GML[l][0]×T[0][c]+Mat_GML[l][1]×T[1][c]+Mat_GML[l][2]×T[2][c]

l increases by 1, c increases by 1, and Mat_GM [l] [c] is iterated until the iteration termination condition is reached, i.e. l<3 & c<3;
for the transformation part:
set the initial value: c=0;

Mat_GM[3][c]=Mat_GML[3][0]×T[0][c]+Mat_GML[3][1]×T[1][c]+Mat_GML[3][2]×T[2][c]+T[3][c]

l increases by 1, c increases by 1, and Mat_GM [3] [c] is iterated until the iteration termination condition is reached, i.e. c<3.

7. The fast global motion matching method according to claim 1, wherein a specific realization process of step 6 preferably includes:

$P_i[0]$=Mat_GM[0][0]×$B_i$[0]+Mat_GM[1][0]×$B_i$[1]+Mat_GM[2][0]×$B_i$[2]+Mat_GM[3][0]

$P_i[1]$=Mat_GM[0][1]×$B_i$[0]+Mat_GM[1][1]×$B_i$[1]+Mat_GM[2][1]×$B_i$[2]+Mat_GM[3][1]

$P_i[2]$=Mat_GM[0][2]×$B_i$[0]+Mat_GM[1][2]×$B_i$[1]+Mat_GM[2][2]×$B_i$[2]+Mat_GM[3][2]

where, $B_i$ is the location information of reference frame point cloud belonging to object, 0≤N≤1, N is the number of reference frame point cloud belonging to object; $B_i$[0] is the x-axis information of point $B_i$, $B_i$[1] is the y-axis information of point $B_i$, and $B_i$[2] is the z-axis information of point $B_i$; the Mat_GM is a matrix of four rows and three columns; $P_i$ is the position information of the point obtained by applying the Mat_GM; $P_i$[0] is the information of x axis of point $P_i$, $P_i[1]$ is the information of the y-axis of point $P_i$, and $P_i[2]$ is the information of z axis of point $P_i$.

8. A dynamic point cloud fast global motion matching system based on centroid point search comprising, road points and object points division unit, associated points search unit, centroid point extraction unit, global motion matrix calculation unit and global motion matrix application unit;

wherein the centroid point search comprising the following steps:

step 1: current frame point cloud is divided into road points and object points by two thresholds top_z_boundary and bottom_z_boundary on z-axis; if z value of point cloud is greater than the top_z_boundary or less than the bottom_z_boundary, it is divided into object points; otherwise, it is divided into road points;

step 2: search associated points corresponding to all object points in a reference frame corresponding to a current frame; the reference frame refers to a reconstructed point cloud frame output by the point cloud of a previous frame after a complete codec process; associated point refers to a corresponding point of the point in the current frame in the reference frame; place the object points with corresponding the associated points into pc_likely_world;

step 3: isometric sampling the pc_likely_world, and put sampled points into pc_world_target; specifically refers to:

define a self-defined array pc_world_target_temp, put the sampled points under an isometric distance of the pc_likely_world into the pc_world_target_temp, divide the pc_world_target_temp into evenly sized blocks, only retain centroid points in each block, and put the centroid points into the pc_world_target;

step 4: find the corresponding points pc_world_ref of the pc_world_target in the reference frame:

step 5: apply LMS algorithm to the pc_world_target and the pc_world_ref to calculate global motion matrix; and step 6: apply Mat GM to the object points of the reference frame point cloud; at this point, a motion estimation process is completed;

the road points and object points division units are used to perform step 1; the association points search unit is used to perform step 2; the centroid point extraction unit is used to perform step 3; the global motion matrix computing unit is used to perform step 4 and step 5; the global motion matrix application unit is used to perform step 6.

9. A computer device, including a memory and a processor, wherein the memory stores a computer program characterized by the realization of any of the steps of claim 1 of the fast global motion matching method for the dynamic point cloud based on the centroid point search when the processor executes the computer program.

10. The computer device according to claim 9, wherein the computer device comprises a computer-readable storage medium on which a computer program is stored, characterized in that, when the computer program is executed by the processor, any of the steps of the fast global motion matching method for the dynamic point cloud based on the centroid point search are realized.

* * * * *